Nov. 18, 1930.  J. RIMMELSPACHER  1,782,014
PACKING GASKET
Filed Aug. 10, 1927
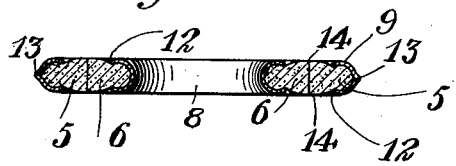
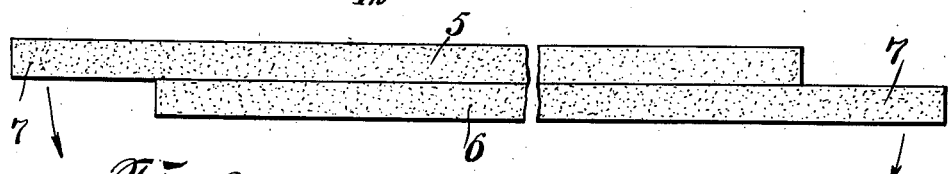
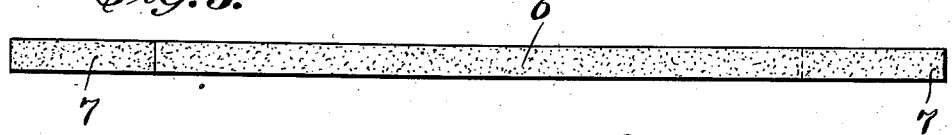
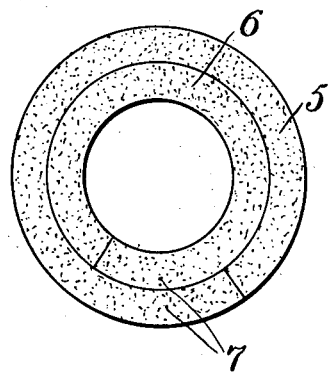
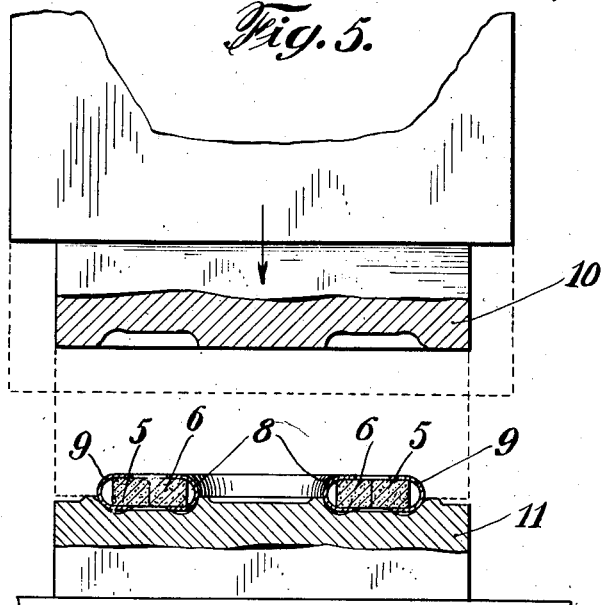
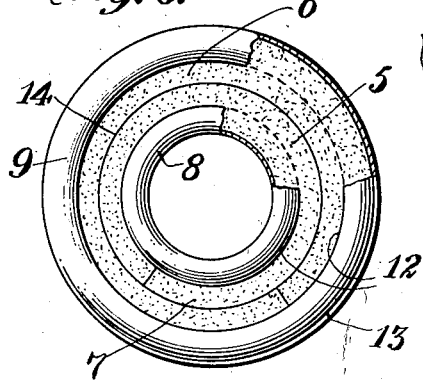
INVENTOR
Joseph Rimmelspacher
BY
ATTORNEY Patented Nov. 18, 1930

1,782,014

UNITED STATES PATENT OFFICE

JOSEPH RIMMELSPACHER, OF NEWARK, NEW JERSEY

PACKING GASKET

Application filed August 10, 1927. Serial No. 211,916.

This invention relates to packing gaskets, and has for its primary object and purpose to provide an improved gasket construction for sealing joints in pumps and for other similar purposes which will be highly efficient and reliable under the most severe conditions of usage.

It is another important object of the invention to provide a packing gasket which is capable of sustaining very high pressures applied in a direction transverse to its plane without permanent deformation or other serious injury thereto such as would result in any appreciable decrease in its effectiveness, or preclude the continued practical use thereof.

It is also another object of my invention to provide a novel gasket construction having the above noted advantages which may be rapidly manufactured at comparatively low cost.

In a practical embodiment of the invention, I provide a gasket body in the form of an annulus preferably of cork and the inner and outer edge portions of this gasket body are securely enclosed within annular sheet metal casings or shells so constructed and arranged as to leave the opposite side faces of the gasket body exposed. Preferably, the gasket body is subjected to pressure between suitable die members and simultaneously, the edges of each shell or casing are permanently embedded in the gasket material, and the outer casing formed centrally thereof with an external reinforcing bead.

With the above and other objects in view, the invention consists in the improved gasket construction and in the form and arrangement of its several parts as will be hereinafter more fully described, illustrated in the accompanying drawing and subsequently incorporated in the subjoined claim.

In the drawing wherein I have disclosed one simple and practical structural embodiment of my present improvements and the method of producing the same, and in which similar reference characters designate corresponding parts throughout the several views,—

Figure 1 is a diametrical sectional view showing the packing gasket as constructed in accordance with one embodiment of the invention;

Fig. 2 is a side elevation illustrating the first step in the manufacture of the article;

Fig. 3 is an edge view looking at right angles to Fig. 2;

Fig. 4 is a plan view illustrating the next step in the manufacture of the new product;

Fig. 5 is a detail vertical section showing the gasket body with the inner and outer encasing members arranged between suitably formed die members for the final operation in the assemblage of the parts, and Fig. 6 is a plan view partly in section of the completed gasket.

Referring in detail to the drawing, the first step in the manufacture of my new gasket construction consists in arranging the two strips or sheets 5 and 6 respectively, of packing material in superimposed relation to each other with the end of one strip or sheet projecting beyond the corresponding end of the other packing strip or sheet. Preferably, cork is used as the packing material, though other materials or substances having similar structural characteristics may be employed. If this material is first assembled in the superposed relation shown in Fig. 2 in the form of sheets of appreciable widths, it is thereafter cut into strips of the desired predetermined thickness as shown in Fig. 3 of the drawing, a suitable slow drying adhesive being applied to the contacting faces of the sheets.

The two cork strips 5 and 6 which are of relatively different lengths are then bent into annular form with the projecting end portions of the respective strips overlapping upon each other as indicated at 7 in Fig. 4 of the drawings, the end edges of each strip being in close abutting contact with each other.

The inner and outer edge portions of this annular body of packing material are then enclosed and permanently secured within the inner and outer sheet metal casings 8 and 9 respectively. These casings are of very light sheet metal, the walls thereof being transversely curved to provide annular channels for the reception of the inner and outer edge portions respectively, of the gasket material. Initially the side walls of these channels are widely spaced apart so that the annular gasket body may be readily engaged therein, and said walls of the sheet metal casings are then forced inwardly under pressure into close contact against the opposite side faces of the gasket strips 5 and 6.

The annular gasket body with its inner and outer edge portions thus enclosed within the sheet metal casings 8 and 9 is now arranged between suitably formed upper and lower die members 10 and 11 respectively. Upon then moving said die members relative to each other, the annular body of the gasket and the sheet metal casings 8 and 9 are subjected to high pressure. The cork or other gasket material is thereby compressed and the side walls of the sheet metal casings 8 and 9 at their edges are bent inwardly and embedded into the opposite side faces of the packing material as indicated at 12. Simultaneously, owing to the form of the die members, the intermediate portion of the wall of the outer sheet metal casing 9 is subjected to opposing pressures on opposite sides of the central plane of the gasket to form an outwardly projecting annular bead or reinforcing rib 13 thereon.

The completed gasket produced in the manner above described, as shown in Fig. 1 of the drawing thus has its inner and outer portions permanently encased and confined within the sheet metal casings 8 and 9, while the opposite side faces of the gasket body between the edges 12 of these casings is exposed as indicated at 14 for direct contact with the parts between which the gasket is arranged. Thus, by the application of the usual pressure transversely of the plane of the gasket against the exposed side faces 14 of the compressible gasket material, an absolutely fluid tight joint will be obtained. Such compressing pressure upon the cork or other gasket material tends to radially expand the same outwardly and in view of the fact that the casings 8 and 9 are of relatively light sheet metal, such radial expanding pressure of the gasket material against the wall of the outer casing 9 would tend to rupture, or distort the casing wall. However, by the provision of the annular reinforcing bead or rib 13, this tendency of the expanding pressure to distort or rupture said wall is overcome so that the enclosing casing 9 will maintain its form or shape, and the edges of the walls of said casing will remain in secure embedded gripping engagement with the opposite sides of the gasket material. It will therefore, be seen that my new gasket construction will be of great durability under the most severe usage and maintain its efficiency under all conditions of service.

While I find it most convenient in facilitating quantity production and in order to secure the proper distribution of the forces of compression to produce the body of packing material in the form and manner herein described, it is nevertheless, to be understood that this is not essential, as many of the advantages of my present disclosure would be obtained with other forms and constructions of this gasket body. Likewise, as to the particular form of the inner and outer encasing members 8 and 9 and the manner of securing the same to the gasket body, certain variations thereof might be found desirable in the application of the gasket to different uses. Accordingly, it is to be understood that in the further practical development of the invention, I reserve the privilege of embodying the essential features thereof in other alternative structural forms which might fairly be considered within the spirit and scope of the appended claim.

I claim:

A packing gasket consisting of two flexible strips of packing material of circular form nested one within the other, and each having its ends in abutting contact, and the abutting ends of the packing strips being disposed out of radial alignment with each other, and annular sheet metal casing members of substantially semi-circular form in cross section, each open at one circumferential side thereof, and receiving a portion of one of the packing strips at the inner and outer edges respectively of the gasket, the side walls of said sheet metal members extending upon the opposite side faces of the respective packing strips, the opposed edges of the inner and outer members being spaced apart and embedded in the packing material of the respective strips, the exposed portions of the packing strips at opposite sides of the gasket having their surfaces disposed in substantially the same plane as the faces of the side walls of said sheet metal members.

In testimony that I claim the foregoing as my invention, I have signed my name hereto.

JOSEPH RIMMELSPACHER.